United States Patent [19]
Nagazumi

[11] Patent Number: 5,247,472
[45] Date of Patent: Sep. 21, 1993

[54] FUZZY LOGIC OPERATION CIRCUIT UTILIZING CHARGE COUPLED DEVICES

[75] Inventor: Yasuo Nagazumi, Tokyo, Japan
[73] Assignee: G.D.S. Co., Ltd., Japan
[21] Appl. No.: 760,745
[22] Filed: Oct. 15, 1991

Related U.S. Application Data

[62] Division of Ser. No. 478,136, Feb. 9, 1990, Pat. No. 5,136,685.

[51] Int. Cl.$^5$ ............................................. G06F 15/00
[52] U.S. Cl. ...................................... 364/807; 395/3; 395/900
[58] Field of Search ...................... 364/807, 862, 602; 307/201; 357/24; 395/3

[56] References Cited

U.S. PATENT DOCUMENTS

| | | | |
|---|---|---|---|
| 4,694,418 | 9/1987 | Ueno et al. ............... | 395/3 |
| 4,716,540 | 12/1987 | Yamakawa ............... | 395/3 |
| 4,837,725 | 6/1989 | Yamakawa ............... | 395/3 |
| 4,875,184 | 10/1989 | Yamakawa ............... | 395/3 |
| 5,136,685 | 8/1942 | Nagazumi ............... | 364/807 |

OTHER PUBLICATIONS

Jia-Yuan Han et al, "A CCD Realization of VSLI Fuzzy Inference Machine in Expert Systems," pp. 855–859, 1988.

Hans G. Kerkhoff and Huub A. J. Robroek, "The Logic Design of Multiple-Valued Logic Functions Using CCDs," 1982.

Jia-Yuan-Han, "Multiple-Valued VLSI and Systolic Array with CCD Realization," 1989.

Hans G. Kerkhoff et al., "Multiple-Valveu Logic Charge-Coupled Devices," 1981.

*Primary Examiner*—Jerry Smith
*Assistant Examiner*—Jim Trammell
*Attorney, Agent, or Firm*—King and Schickli

[57] ABSTRACT

A fuzzy logic operation circuit for two inputs includes two identical charge coupled devices having at least first and second gate electrodes connected in parallel on an output side and floating gates provided to a transfer electrode on an input side. A comparison device compares charge detection signals from the floating gates with each other and selects an input signal of either the smaller or greater of the two inputs by the comparison output.

2 Claims, 8 Drawing Sheets

| SYMBOL | LABEL |
|---|---|
| $T_1, T_2, T_3$ | TRANSFER ELECTRODE |
| $OG_1, OG_2$ | OUTPUT GATE |
| $OD_1, OD_2$ | OUTPUT DIODE |

FUZZY LOGIC OPERATION CIRCUIT UTILIZING CHARGE COUPLED DEVICES

This is a division of application Ser. No. 07/478,136, filed Feb. 9, 1990, U.S. Pat. No. 5,136,685.

TECHNICAL FIELD

The present invention relates to a fuzzy logic operation circuit in which charge coupled devices (CCD) are used and more particularly to a fuzzy logic operation circuit and a fuzzy computer using the logic operation circuit which is capable of performing high-speed logic operations by utilizing the properties of CCDs.

BACKGROUND OF THE INVENTION

Since professor L. A. Zadeh of the University of California presented the fuzzy theory and its applications in "Journal of Information and Control" in 1965, research and development for practical applications of fuzzy control fuzzy computers and fuzzy artificial intelligence in which the fuzzy theory is employed have been ongoing.

Fuzzy control expresses control algorithms by using an "if... then" format (fuzzy control routine). A fuzzy computer executes the algorithms by using fuzzy inference in order to measure the senses of a human or the ambiguity of a word such as, for example: "knack": that which is obtained from a long period of experience of those skilled workers (expert) in a specific field.

That is ambiguous word information corresponding, for example, to "slow", "medium" and "quick", as used to describe a speed, is expressed by respective membership functions. One fact is verified by the respective fuzzy rules of an "if... then" format to check its approximate agreement. A membership function of the consequent section "then" is cut by the agreement of the antecedent section "if" of the above-mentioned rule, and after respective inference results are obtained, an essence is extracted from all the inference results consisting of the ambiguous information (this is called defuzzification).

Numerous defuzzification methods have been proposed. However, in practice, a center-of-gravity method is most widely used.

Next, let's consider a computer which performs fuzzy inference (here, this is tentatively called a "fuzzy computer"). Information handled by a conventional digital computer is al definite information expressed by binary information (binary words of a combination of 0 and 1). A fuzzy computer, however, must handle information specified by a membership function for each ambiguous word information. Hence, a fuzzy computer must process a great amount of information expressed by decimals, for example, 0., 0.1 0.2, 0.3, ... in grades from 0 to 1 with respect to respective membership functions, concerning a word to be processed (this is tentatively called a "fuzzy word").

Although a fuzzy computer handles ambiguous word information such as "slow", "quicker" and so forth, a "fact" (input information) of the inference executed by a fuzzy logic operation circuit in a fuzzy computer and output information are definite values (e.g., 15°, 5 V, etc.). Accordingly, if this input and output information cannot be processed at high speed, even if fuzzy inference in execution in the fuzzy computer is performed at high speed, its processing is limited greatly.

Even after professor Mamdani of London University presented in 1974 the first expert system by means of fuzzy control in which fuzzy theory is applied (fuzzy control for a steam engine), the history of fuzzy control technology is still short. It has not been until recently that some full-fledged expert systems with highly rated advantages have been realized.

In the execution of fuzzy inference for fuzzy control, it has been found in the art that the inference operation may be completed faster by utilizing dedicated hardware (i.e. a digital computer). Accordingly, the speed from the time a "fact" is input to the time the result of its inference is displayed on a display section is limited by the processing performance of the above-mentioned digital computer. As a result, fuzzy logic operation circuits exclusively used for a fuzzy computer have been expected which are capable of effectively performing not only input and output of fuzzy information but also the very fuzzy logic operations themselves.

A method of directly mapping the current state quantity of devices to control quantity via digital memory has been proposed. The method has the possibility of reducing logic operation time remarkably. Fine adjustments of the parameters are, however, difficult. In addition, analog fuzzy information processing chips composed of a combination of a number of operational amplifications and so forth have now been developed, but they are not sufficient in logic operation, speed or processing performance.

Charge transfer type devices represented by CCDs are comparatively new Si devices announced by Boyle in 1970 and utilize minority carriers and dynamic electric-field effects. The devices have been developed considerably by novel technical concepts such that functional devices are constituted by charge transfer and the use of LSI technology. By using the properties of CCDs, image pickup devices, large capacity memories, analog signal processing, and numerous kinds of filters, including matched filters, delay lines and so forth, have been put to practical use. However, at present, they are not used to any degree in a high-level information processing apparatus such as a fuzzy computer.

An object of the present invention is to provide a basic fuzzy logic operation circuit in which the properties of the CCDs, resulting from a charge transfer function, are employed to provide the following multi-functionality: analog memory; direct handling of an analog quantity; low power consumption; low noise; and an economical fuzzy computer using the circuit.

The minimum functions necessary for a fuzzy operation can be realized by the following two kinds of basic functions and their combination because of the properties of a well-known "fuzzy inference engine" (e.g., architecture in which A and B as a knowledge and A' as a fact are input and B' is output as a conclusion), (for details, see "Concept of a Fuzzy Computer", by Retsu Yamakawa, published in Aug. 19, 1988, Kodansha Publishing Co.). The minimum functions are summarized as follows:

i) a function to select a maximum or minimum quantity of information from among a plurality of fuzzy information and output it, and ii) a function capable of determining its representative value for a plurality of ranked fuzzy information.

The present invention comprises basic fuzzy logic operation circuit devices and a defuzzifier using CCDs and a fuzzy computer composed of a number of the above-mentioned fuzzy logic operation circuit devices and connected with the above-mentioned defuzzifier.

Since a basic fuzzy logic operation circuit device and defuzzifier having AND and OR functions are constructed by using CCDs, a high-speed fuzzy computer exclusively used for fuzzy control can be realized. This is done by connecting as many of the above-mentioned circuit devices in parallel as there are numbers of fuzzy variables and connecting the above-mentioned defuzzifier to its output side.

BRIEF DESCRIPTION OF THE DRAWINGS

These and other objects, features and advantages of the present invention will become clear by the following description of the preferred embodiments of the present invention with reference to the accompanying drawings, wherein:

FIGS. 3(a) and (b) are views showing a large and small selection circuit for two inputs which is formed of a combination of the two from the circuits of FIGS. 1 or 2 and their symbols;

FIGS. 4(a) and (b) are views showing an embodiment of a large input signal selection circuit for a number of input signals in which a number of selection circuits of FIG. 3 are used and resistors and operational amplifiers are connected in a matrix form and their symbols;

FIGS. 5(a) and (b) are views showing an embodiment of a fuzzy AND-OR circuit and its symbols;

FIGS. 7(a) and (b) are views showing an embodiment of a defuzzifier using CCDs and its symbols;

DETAILED DESCRIPTION OF THE INVENTION

In the figures, ID indicates an input diode; $G_1$ and $G_2$, the first and second gate electrodes respectively; $T_1$, $T_2$ and $T_3$, the first to third transfer electrodes respectively; $OG_1$ and $OG_2$, the first and second output gate electrodes respectively; $OD_1$ and $OD_2$, the first and second output diodes respectively; FG, a floating gate; H, a channel stop; 1 and 2, OR gates; 3, an inverter; 4, a FG amplifier; 50 and 60, shift registers; $M_{11}$ to $M_{KN}$, the first group of memory devices; 100, an agreement calculation section; 200, a truncation and composition section; $M_{11}'$ to $M_{KN}'$, the second group of memory devices; 300, a defuzzifier; C, a large and small selection circuit for inputs; E, a maximum input selection circuit for a number of inputs; and $A_1$ to $A_K$, amplifiers.

Figure 1A:
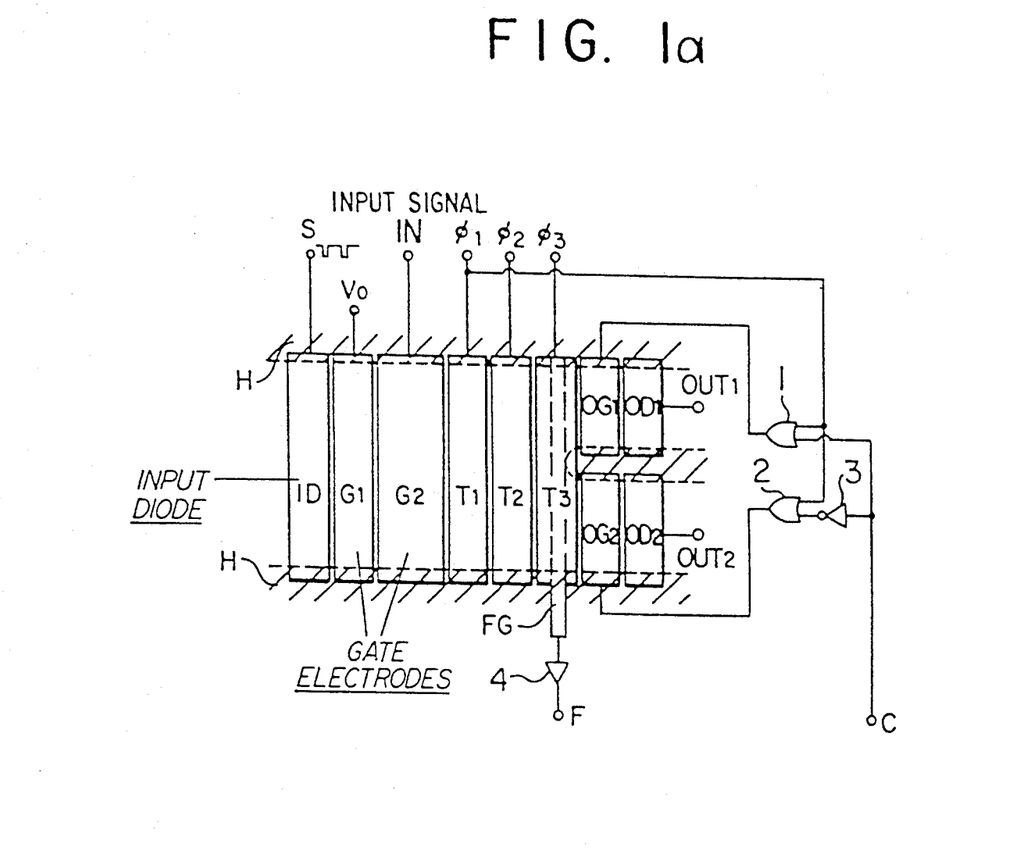
FIGS. 1(a) and (b) are views showing an embodiment of an output selection circuit for two inputs using CCDs, which is one of the embodiments of a basic circuit of the present invention, and its symbols.

FIG. 1(a) shows one embodiment of a fuzzy logic operation circuit using CCDs of the present invention.

In this embodiment, a three-phase PE (potential equilibration) method is adopted to inject signal charges to the potential well of the transfer electrodes of CCDs.

In the figure, ID indicates an input diode; $G_1$, the first gate electrode; $G_2$, the second gate electrode; $T_1$, the first transfer electrode; $T_2$, the second transfer electrode; $T_3$, the third transfer electrode; FG, a floating gate; $OG_1$, the first output gate electrode; $OG_2$, the second output gate electrode; $OD_1$, the first output diode; $OD_2$, the second output diode; 1 and 2, OR gates; 3, an inverter; 4, a FG amplifier; H, a channel stop; S, an input terminal; $\phi_1$, $\phi_2$ and $\phi_3$, input terminals for driving pulses; F, a control signal pick-out terminal; C, an input terminal for a selection signal; and $OUT_1$ and $OUT_2$, output terminals.

In operation, a short-pulse voltage is applied to an ID and charges from the ID are injected into the potential well of $G_2$ by crossing the barrier of $G_1$. Next, the ID is reverse biased and extra charges exceeding the barrier of G1 are injected into the ID, after which driving pulses $\phi_2$, $\phi_3$ and $\phi_1$ are respectively provided in turn to $T_2$, $T_3$ and $T_1$ to transfer charges.

When the charges transferred from the input side reach the floating gate (FG), the charges are detected by the floating gate. A voltage signal corresponding to the charge quantity is induced and amplified via a floating gate amplifier 4, after which a corresponding signal is picked out from the pick-out terminal.

On the other hand, since a selection signal is provided to the terminal C, the output gate $OG_1$ or $OG_2$ is actuated via gate 1 or 2, and a charge signal is output from the corresponding output diode $OD_1$ or $OD_2$. When the selection signal is low, the output signal $OUT_2$ (which is greater) may be selected. When its level is high, the output signal $OUT_1$ (which is smaller) may be selected.

Figure 1B:
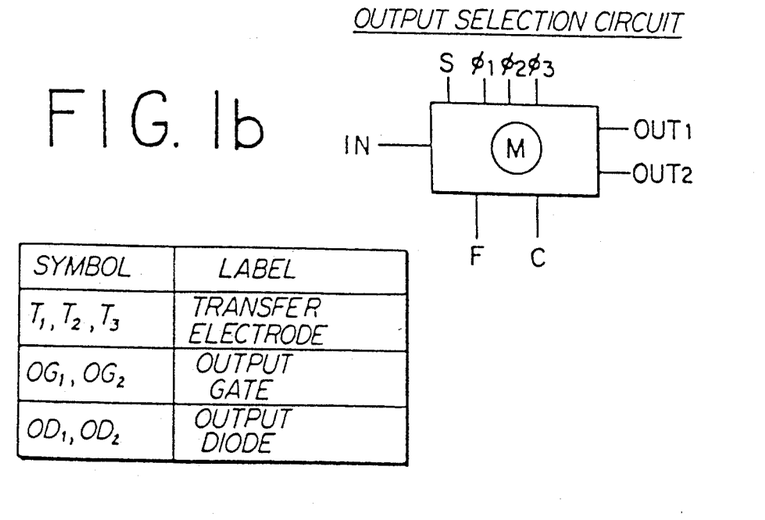

FIG. 1(b) is a view showing the logic operation circuit of FIG. 1(a) which is formed to operate as described above by using one symbol.

As described later, in the present invention, another selection circuit is formed by combining a number of basic circuit devices represented by symbols.

Figure 2A:
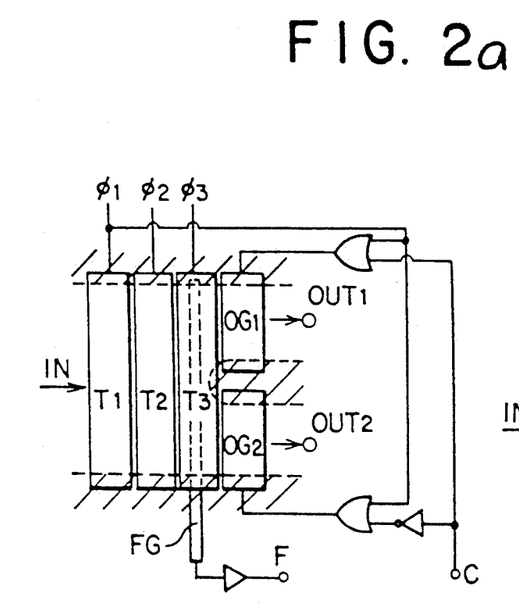
FIGS. 2(a) and (b) are views of another embodiment of an output selection circuit for two inputs of charge input type.

In a case where input and output signals are input and output to the basic circuit in the form of charges, an input diode ID at the input side, the first and second gate electrodes $G_1$ and $G_2$, and the first and second output diodes $OD_1$ and $OD_2$ can be omitted. FIG. 2(a) shows such a structure, and FIG. 2(b) illustrates their symbols.

Figure 2B:
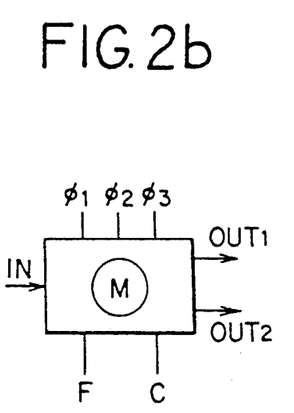
Figures 3A, 3B:
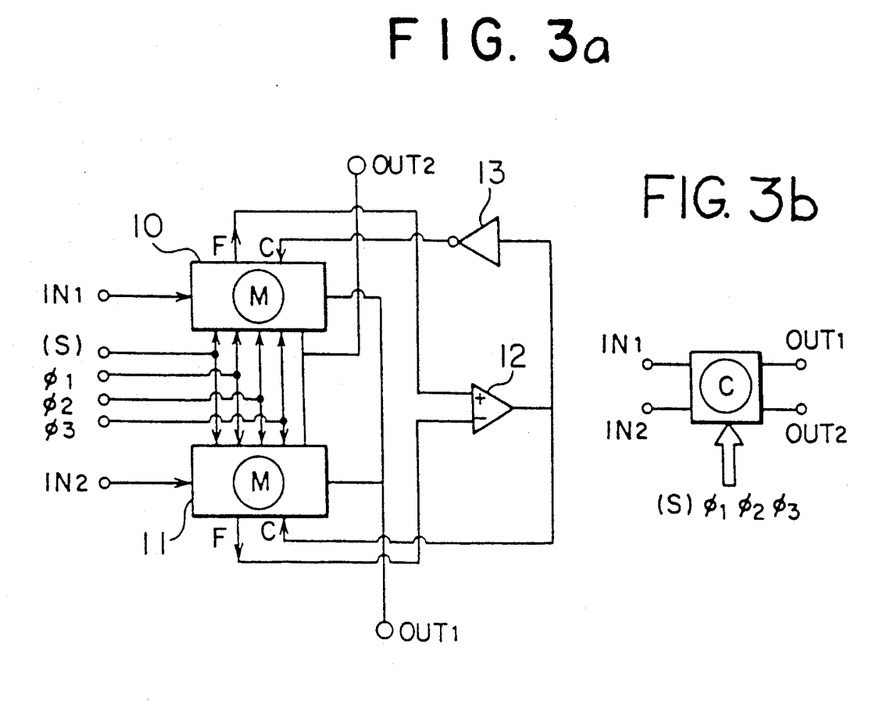

FIG. 3(a) shows an embodiment of a minimum value selection circuit for two input signals formed of a combination of two basic circuits shown in FIG. 1(b) or FIG. 2(b). The above-mentioned basic circuits 10 and 11 are connected in parallel. Each of the terminals F is connected to each of the inputs of a comparator 12, and the output side of the above-mentioned comparator 12 is connected to the terminal C of a basic circuit 10 via an inverter 13 and connected to the terminal C of a basic circuit 11. As a result, by comparing a control signal detected by each of the floating gate terminals F of the two basic circuits 10 and 11, an output corresponding to the greater transfer charges can be obtained from the output terminal $OUT_2$ and an output corresponding to the smaller transfer charges can be obtained from the output terminal $OUT_1$.

FIG. 3(b) shows symbols of the basic circuit of FIG. 3(a) which is integrally formed to operate in this way.

Figures 4A, 4B:
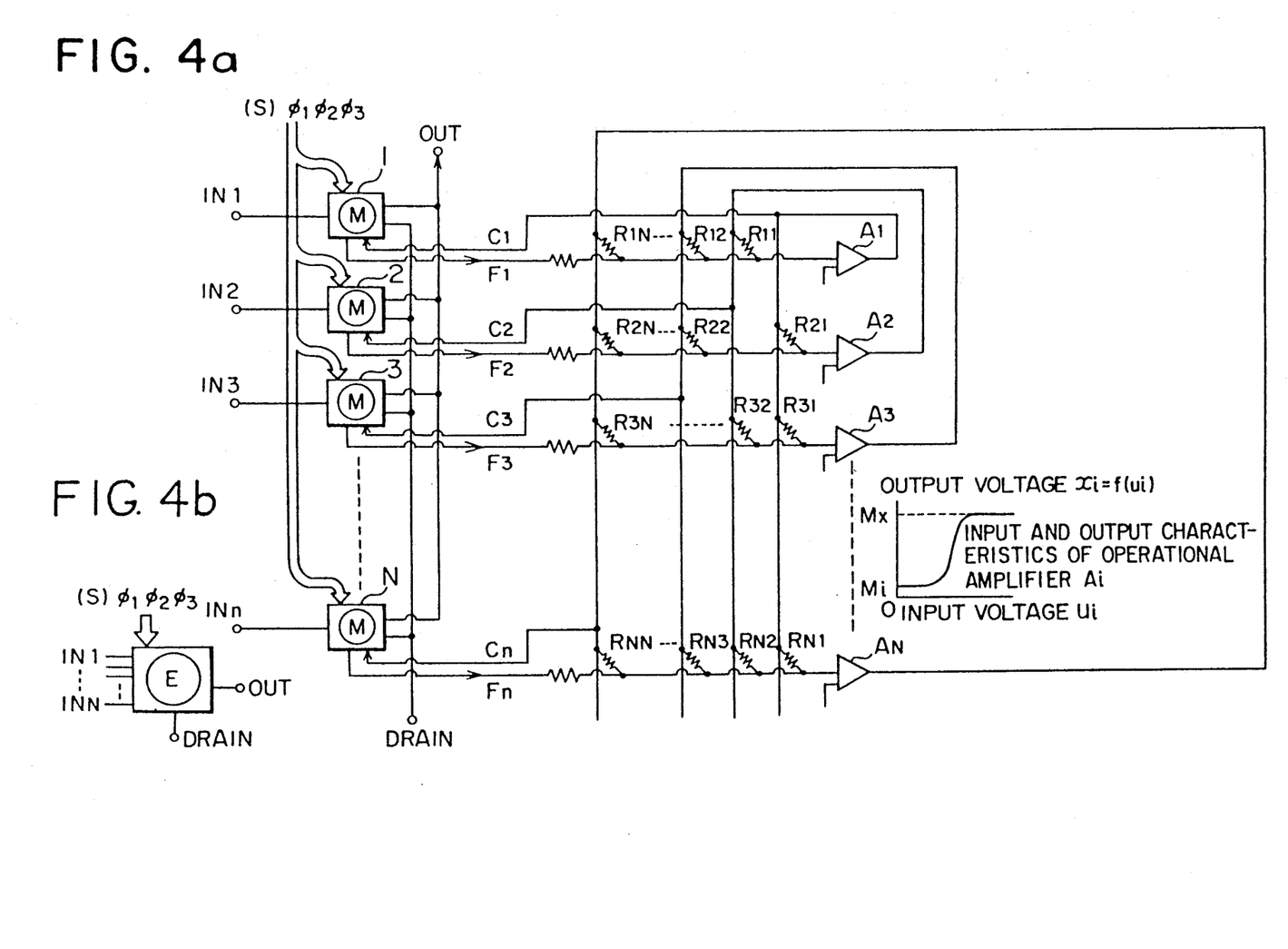

FIG. 4(a) shows an embodiment of a selection circuit which selects a maximum input signal from among a number of input signals and outputs it.

In this embodiment, a matrix-like structure (equivalent to an analog electronic circuit model of a neural network; see "Neural Computers" by Aihara Kazuyuki, published by Tokyo Denki University, 1988) of the outputs from $F_1, F_2, F_3 \ldots F_N$ terminals and inputs provided to $C_1, C_2, C_3 \ldots C_N$ is provided using operational amplifiers $A_1, A_2, A_3 \ldots A_N$ and resistors $R_{11}$ to $R_{1N}$, $R_{21}$ to $R_{2N}$, $R_{31}$ to $R_{3N}$, $\ldots R_{N1}$ to $R_{NN}$ as shown in FIG. 4(a). Using basic circuits 1, 3, 3, ... N as shown in FIG. 1(b) or FIG. 2(b) enables a selection of the output from the basic circuit in which is given a maximum input signal among all input signals to be made.

When input and output characteristics of respective operational amplifiers are as shown in FIG. 4, an equal number of input voltages are added via resistors $R_{i1}$ to $R_{iN}$ (i = 1, 2, 3 ... N) at each stage. Therefore, by making the threshold value of the input and output characteristics of respective amplifiers proper, a maximum signal among input signals can be picked out from the output terminal.

FIG. 4(b) shows the basic circuit of FIG. 4(a) which selects a maximum signal among a number of input signals in this way by a symbol as a single unit. In FIG. 4, output from the terminal $D_{rain}$ is not necessary for the time being. However, it is apparent to one skilled in the art that a minimum signal among a number of input signals can also be selected by properly selecting input and output characteristics of an amplifier.

Figures 5A, 5B:
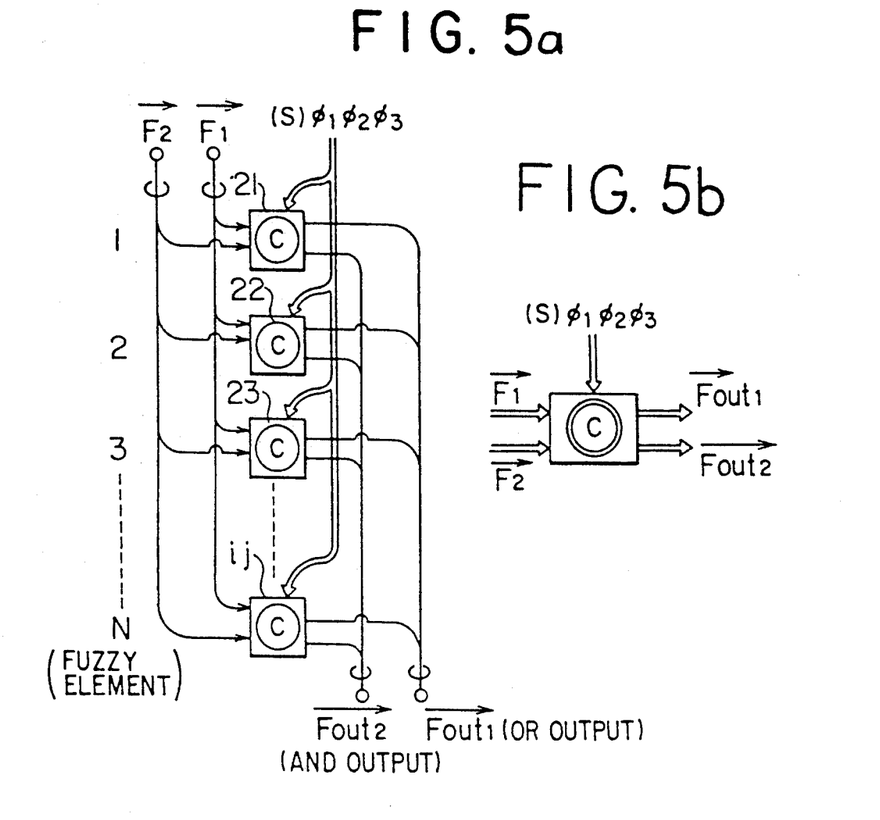
Figure 6:
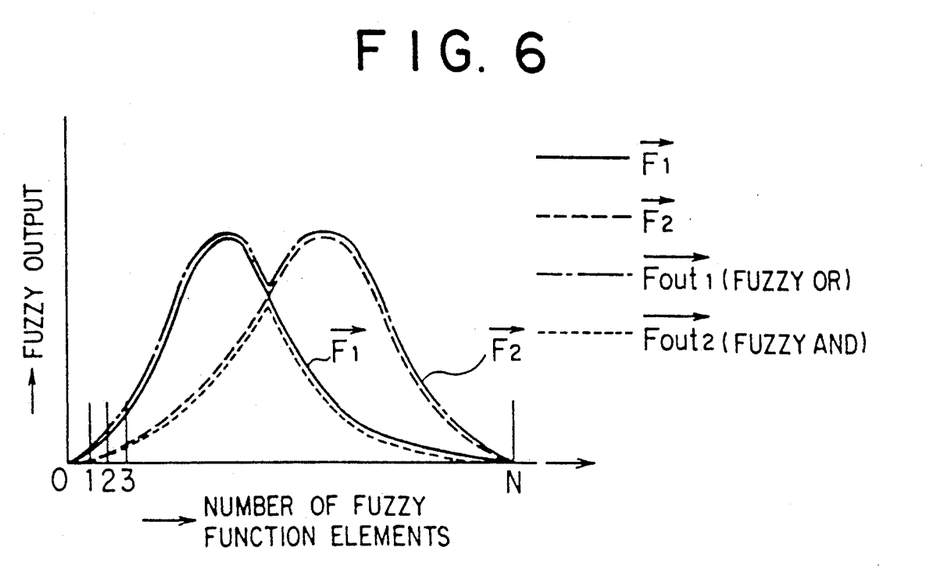
FIG. 6 is a view showing logic operation outputs of two fuzzy membership functions.

FIG. 5(a) shows an embodiment of fuzzy OR and fuzzy AND circuits by which OR logic and AND logic functions can be achieved. In this embodiment, if a plurality of two-input selection circuits shown in FIG. 3(b) are connected in parallel and denoted by 21, 22, 23, ... ij, and elements $F_1$ and $F_2$ constituting two membership functions are input respectively to the two-input selection circuit, a fuzzy AND output can be picked out from one of the output terminals and a fuzzy OR can be picked out from the other output terminal. That is, as shown in FIG. 6, of the two membership functions $F_1$ and $F_2$, a double-humped envelope becomes a fuzzy OR and the envelope of the common portion becomes a fuzzy AND.

FIG. 5(b) shows the symbols of the fuzzy AND-OR operation device of FIG. 5(a) which is formed to operate as mentioned above.

FIG. 7 shows an embodiment in which a defuzzifier necessary for a fuzzy computer is composed of CCDs. In the figure, $T_1$ indicates the first transfer electrode; $T_2$, the second transfer electrode; $T_3$, the third transfer electrode; $G_1$, a gate electrode; $T_4$, the fourth transfer electrode; $B_1$, the first bus; $B_2$ the second bus; $S_1$ and $S_2$, FET transistors; $R_1$ and $R_2$, resistors; OR, an operational amplifier; H, a channel stop.

The gate electrode $G_1$ is divided into two different lengths $b_1$ and $b_2$ in each of the channels $CH_1$ to $CH_N$. The length division ratio $b_1:b_2$ is varied for each channel at a predetermined ratio. This ratio is called an effective area, which is effected by areas of the two portions of electrodes $G_1$. For example, it is structured as $b_1/(b_1+b_2) = 0.1, 0.2, 0.3 \ldots 0.9$ from the left. Each channel corresponds to the number of elements forming a membership function, namely, the number of elements of a fuzzy word.

With such a structure, a function to determine a representative value for a plurality of ranked signals (the function ii mentioned at the beginning) can be achieved. In other words, an operation to find the center of gravity of the whole fuzzy inference results can be performed.

In operation, charges $q_1, q_2, q_3 \ldots q_N$ provided to the input of the defuzzifier are transferred via transfer electrodes $T_1, T_2,$ and $T_3$, to which driving pulses $\phi_3, \phi_1$ and $\phi_2$, are applied to the gate electrode $G_1$. Until they reach the transfer electrode $T_4$, after passing through channels of different division ratios $b_1/(b_1+b_2)$ in the gate electrode $G_1$, charges determined by the above-mentioned division ratio $b_1$ and $b_2$ are collected on buses $B_1$ and $B_2$. Because bus $B_2$ is connected to the source of a FET transistor $S_2$ and bus $B_1$ is connected to the source of a FET transistor $S_1$, when $\phi_1$ is provided to the gate electrode $S_1$ and $S_2$, a potential difference corresponding to the integrated difference in charges between buses $B_1$ and $B_2$ is picked out and output via the operational amplifier OP.

Potentials $VB_1$ on the bus $B_1$ and $VB_2$ on the bus $B_2$ and potential difference V between $VB_1$ and $VB_2$ are expressed by the following formulae respectively:

$$VB_1 = k(b_1 xq_1 + b_1' xq_2 + b_1'' xq_3 + \ldots + b_1''' xq_n)$$

$$VB_2 = k(b_2 xq_1 + b_2' xq_2 + b_2'' xq_3 + \ldots + b_2''' xq_n)$$

$$V = VB_1 - VB_2$$

$$= k\{(b_1 xq_1 + b_1' xq_2 + \ldots + b_1''' xq_n) - (b_2 xq_1 + b_2' xq_2 + \ldots + b_2''' xq_n)\}.$$

Figures 7A, 7B:
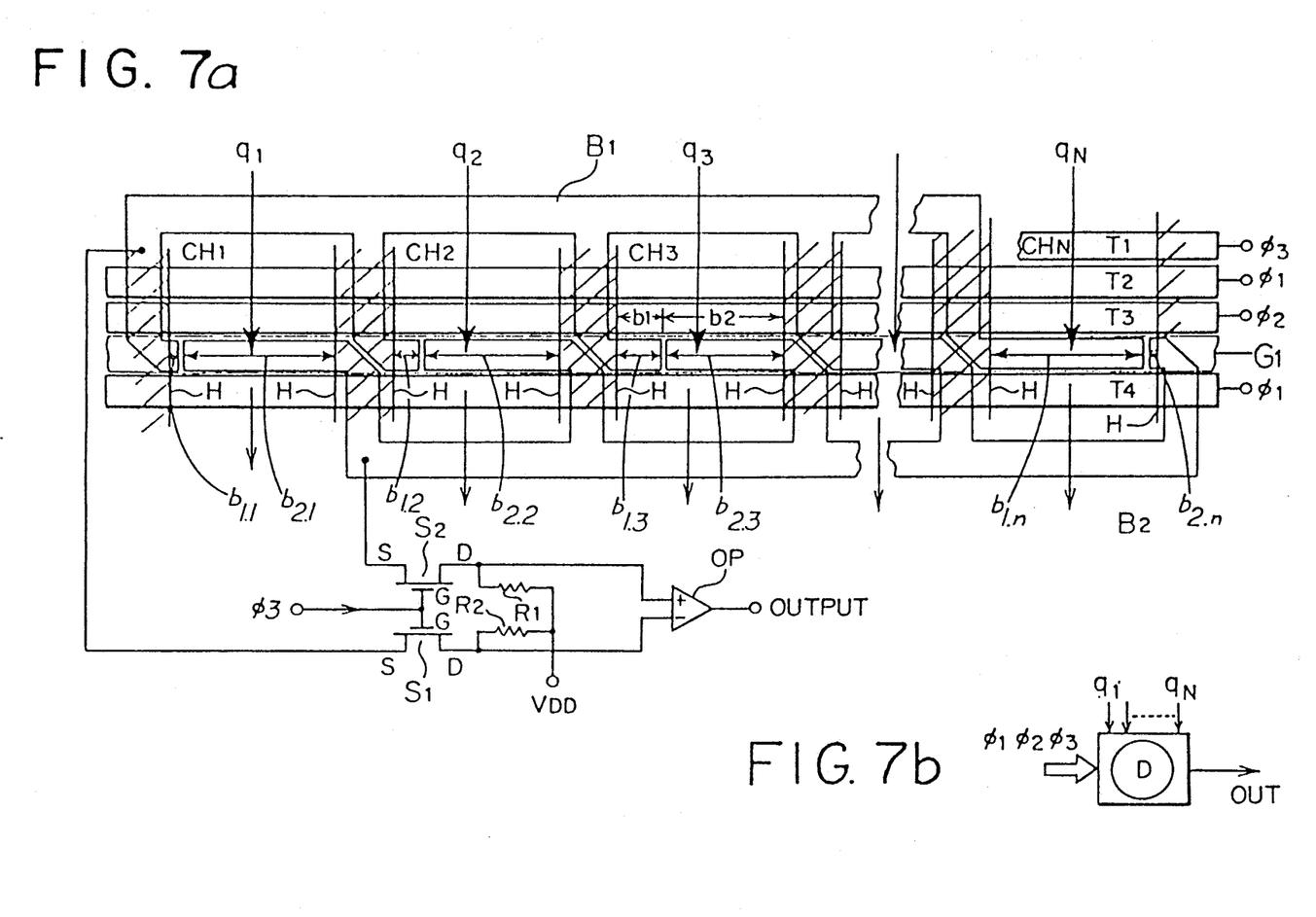

For example, because the $G_1$ of each channel is divided at ratios of 1:9, 2:8, 3:7 ... 9:1 from the left in the embodiment shown in FIG. 7(a) (assuming that it has 10 channels), the potential V output from the operational amplifier OP is expressed by:

$$V = K\{(0.9 \times q_1 + 0.8 \times q_2 + 0.7 \times q_3, \ldots 0.1 \times q_9) - (0.1 \times q_1 + 0.2 \times q_2 + 0.3 \times q_3, \ldots 0.9 \times q_9)\}$$

(where K is a sensitivity coefficient determined by a circuit).

The center-of-gravity position of the charge distribution can be picked out from the fourth transfer electrode $T_4$ by providing a means (not shown) capable of detecting the total amount of charge transferred via all the channels. That is, the above-mentioned V is the same as that of the equation for finding the moment of the charge quantity of all channels. Therefore, in a case where the above-mentioned V directly expresses the center position of the charge distribution and the total quantity of charge fluctuates, if the total quantity of input charges $q_1 + q_2 + q_3 + \ldots q_9$ is constant, the center-of-gravity position can be determined similarly by dividing the output by the total quantity of charges detected by $T_4$. In this way, a defuzzifier, in which the center-of-gravity of a final membership function obtained from each fuzzy inference result is calculated, can be operated by fuzzy control.

FIG. 7(b) shows symbols of the basic circuit of the defuzzifier of FIG. 7(a) which is formed to operate as described above.

Figure 8:
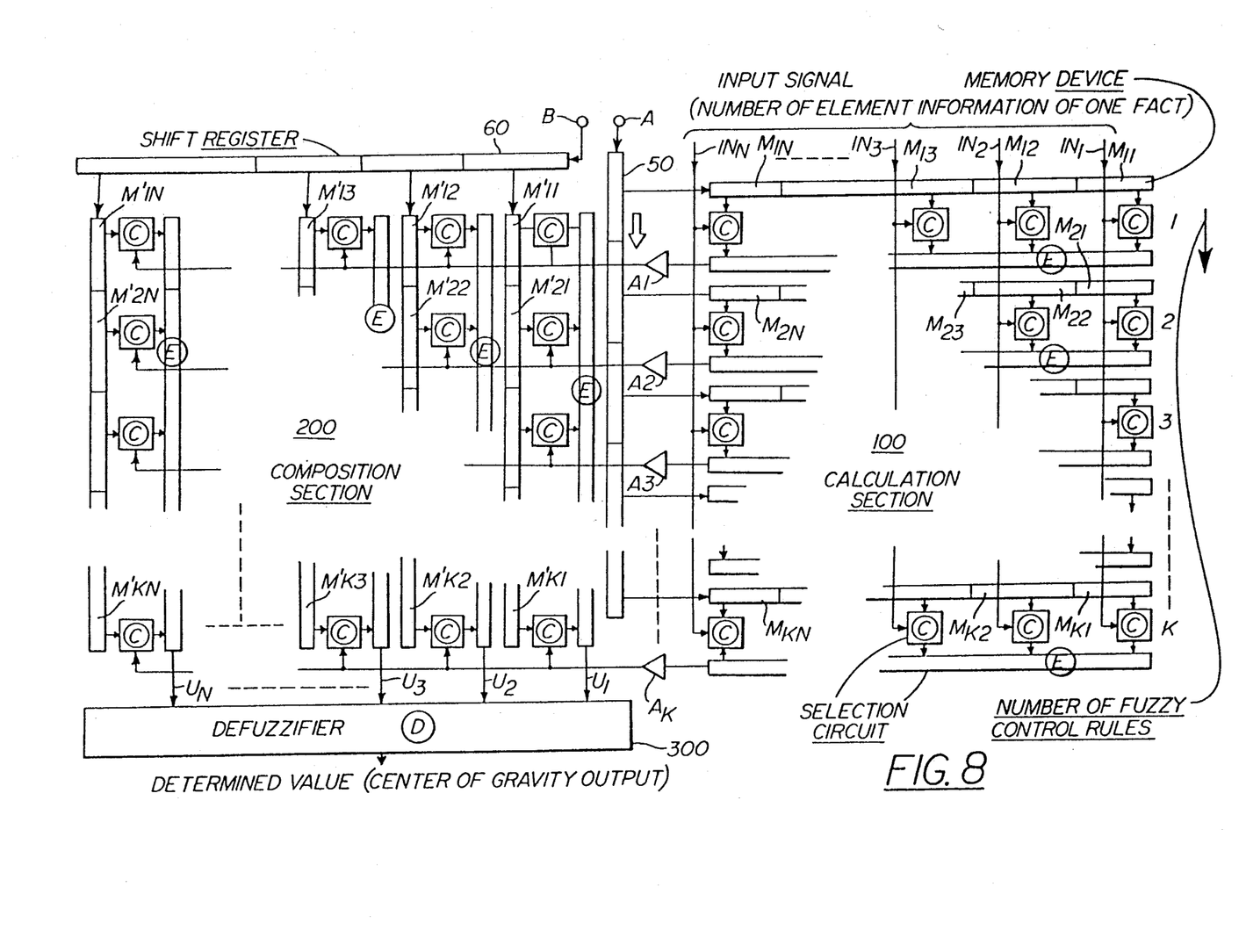
FIG. 8 is a view showing an embodiment of a fuzzy computer formed by a number of respective basic circuits of the present invention.

FIG. 8 shows an embodiment of a fuzzy computer configured using the above-mentioned basic circuit devices of the present invention.

The fuzzy computer of the present invention is broadly comprised of the following three sections: an agreement calculation section 100; a truncation and composition section 200; and a defuzzifier 300.

The agreement calculation section 100 comprises memory devices $M_{11}$ to $M_{1N}$ in which the elements of the first membership function $f_1$ are stored, memory devices $M_{21}$ to $M_{2N}$ in which the elements of the second membership function $f_2$ are stored, ... memory devices $M_{K1}$ to $M_{KN}$ in which the elements of the K-th membership function $f_K$ are stored. These correspond to respective antecedent sections "if" of fuzzy control rules 1, 2, 3, ... K. The calculation section 100 also comprises selection circuit C composed of the elements shown in FIG. 3(b) which select the smaller of two inputs, and selection circuit E shown in FIG. 4(b) which selects a maximum value among the signals output from the selection circuit.

The truncation and composition section 200 comprises memory devices $M_{11}'$ to $M_{1N}'$ in which the elements of the first membership function $f_1'$ are stored, memory devices $M_{21}'$ to $M_{2N}'$ in which the elements of the second membership function $f_2$ are stored, ... memory devices $M_{K1}'$ to $M_{KN}'$ in which the elements of the K-th membership function $f_K'$ are stored. These correspond to respective consequent sections "then" of fuzzy control rules 1, 2, 3, ... K. The truncation and composition section 200 also comprises respective selection circuits C which truncate (cut out) respective membership functions of the above-mentioned consequent section "then" by respective outputs from respective maximum value selection circuits E of the agreement calculation section 100, and respective selection circuits E which select a maximum output from among the outputs from the above-mentioned respective selection circuits C.

The defuzzifier 300 comprises a basic circuit shown in FIG. 7(b).

In FIG. 8, 50 designates a first shift register which sends respective element information of the above-mentioned respective membership functions $f_1, f_2 \ldots f_K$, input from the input terminal A, to the above-mentioned respective storage devices. A second shift register 60 sends respective element information of the above-mentioned respective membership functions $f_1'$, $f_2', \ldots f_K'$ input from the input terminal B, to the above-mentioned respective memory devices $M_{11}'$ to $M_{1N}'$, $M_{21}'$ to $M_{2N}' \ldots M_{K1}'$ to $M_{KN}'$, and $A_1$ to $A_K$, amplifiers.

The operation of the fuzzy computer of the present invention constructed as described above will be described below.

When respective elements $N_{11}$ to $N_{1N}$ forming a fuzzy word (a membership function of a fact) corresponding to one "fact" are input to the agreement calculation section 100, they are compared with the contents of respective membership functions $f_1, f_2, \ldots f_K$ stored in respective memory devices $M_{11}$ to $M_{12}$, $M_{21}$ to $M_{2N}$ ..., $M_{K1}$ to $M_{KN}$ and a smaller signal is selected from respective selection circuits C. Maximum outputs among the outputs from respective selection circuits C, corresponding to respective fuzzy control rules 1, 2, 3 . .. K, are output from respective selection circuits E and then are sent to the truncation and composition section 200 via respective amplifiers $A_1$ to $A_N$.

In this way, respective outputs from respective circuits E (respective maximum values) and respective membership functions $f_1', f_2', \ldots f_N'$ of the consequent section "then" of fuzzy control rules, which are stored in respective memory devices $M_{11}'$ to $M_{1N}'$, $M_{21}'$ to $M_{2N}' \ldots M_{K1}'$ to $M_{KN}'$, are truncated.

In this way, respective maximum values corresponding to envelopes of respective membership functions $f_1'$, $F_2', \ldots f_N'$, which are cut by predetermined values (i.e., signals $u_1$ to $u_N$) corresponding to one total inference result membership function in which respective fuzzy information results are combined, are output from respective maximum value selection circuits C of the truncation and composition section 200, and these signals are provided to the defuzzifier 300.

The defuzzifier 300 determines the moment of respective input signals $u_1$ to $u_N$ to find the center-of-gravity position of the above-mentioned total inference result membership function on the basis of the principles explained in FIG. 7(a), and outputs it as a determined value.

Figure 9A:
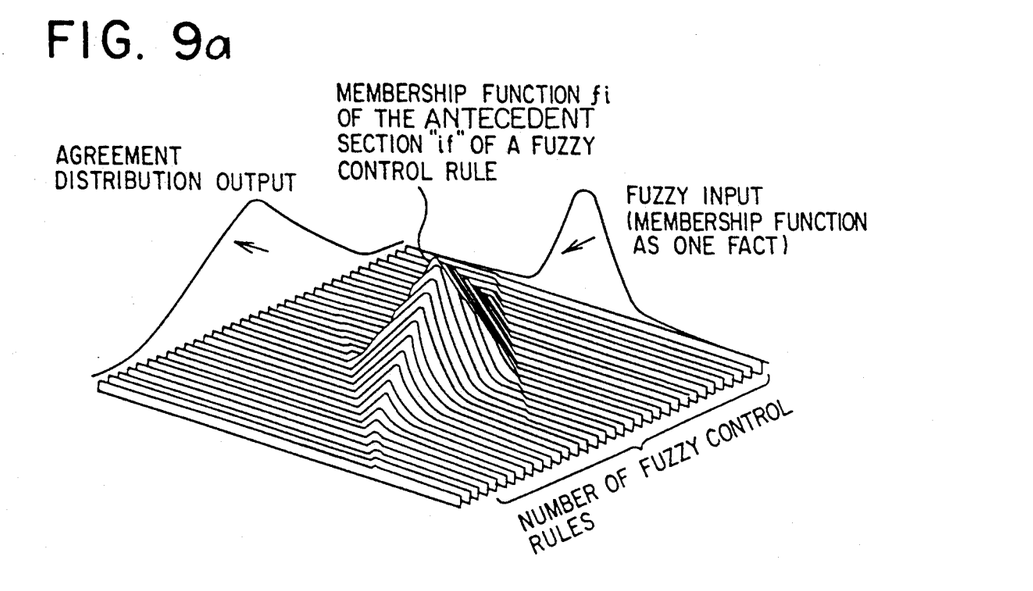
FIGS. 9(a) and (b) are simulation model views for explaining a process from the time a fuzzy input is given and a truncation and composition signal is output through an agreement calculation.

FIG. 9(a) shows a state in which the agreement of the fuzzy input, which is input to the agreement calculation means 100 of the fuzzy computer of FIG. 8 as one fact, is checked with respective membership functions of the fuzzy control rule antecedent section stored in respective vertical storage devices. These agreement distribution outputs are shown as generated in a simulation model.

Figure 9B:
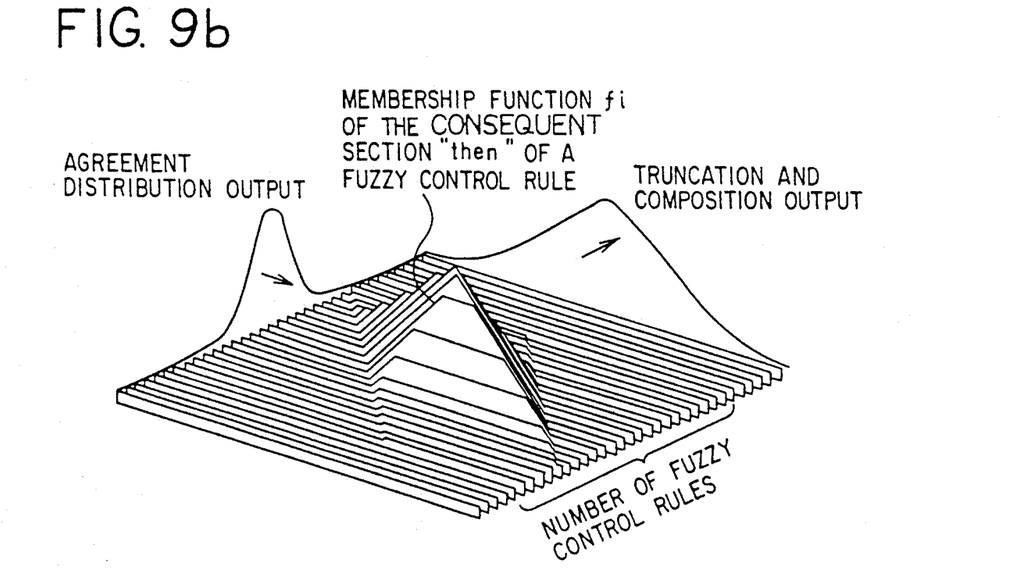

FIG. 9(b) shows a state in which respective membership functions of the consequent sections of the above-mentioned fuzzy rules are cut and combined by respective agreement outputs applied to the truncation and composition section 200 of the fuzzy computer shown in FIG. 8, in another simulation model.

Figure 10A:
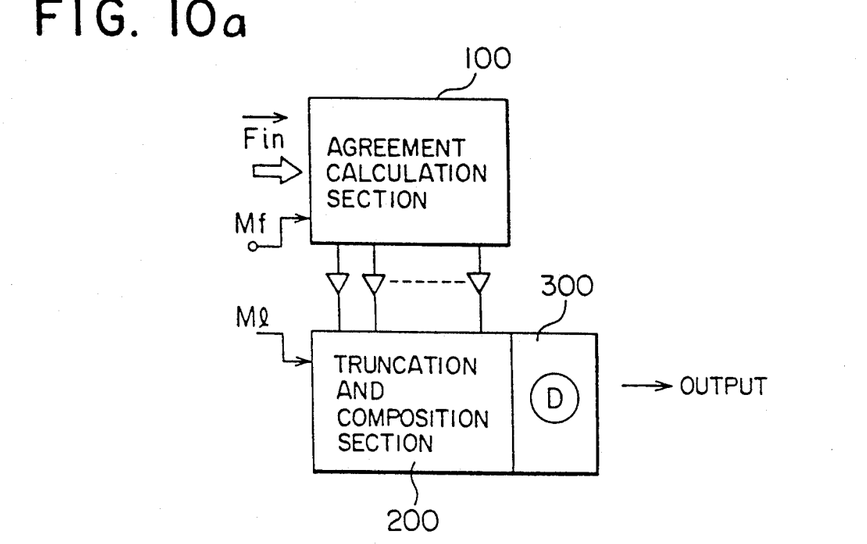
FIGS. 10a and 10b are schematic configurational views of a fuzzy computer in the case where a fuzzy control rule has two AND front subject sections.

In the fuzzy computer shown in FIG. 8, since input Fi (shown in FIG. 10) is one membership function, the antecedent sections of the fuzzy control rules are one each. That is, for simplification, FIG. 8 can be shown as in FIG. 10(a).

Figure 10B:
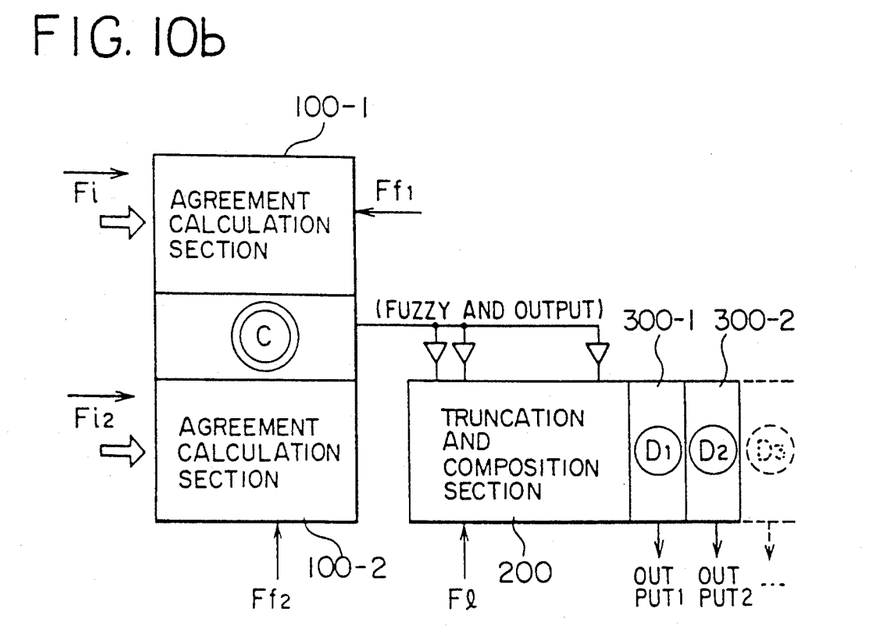

However, in a case where the antecedent section "if" of the above-mentioned rule is set, for example, with the following two conditions (AND) as in "if $A_1$ and $A_2$ and d, then let B be e", two input membership functions of $Fi_1$ and $Fi_2$ are handled for the input of a fact. Therefore, it can be structured as shown in FIG. 10(b) in this case. That is, two agreement calculation sections 100 are used to pick out a fuzzy AND output of the fuzzy AND-OR circuit shown in FIG. 5. It is provided to the truncation and composition section 200. If the center of gravity is picked out via defuzzifiers 300-1 and 300-2, then more complex operations can be performed.

Since the same is true of a case involving three or more antecedent sections of a fuzzy control rule, more complex logic operation control can be performed by the fuzzy computer of the present invention.

Heretofore, embodiments of numerous kinds of basic logic operation circuits required to perform fuzzy logic operations and a fuzzy computer using these circuit devices have been explained. In the present invention, basic logic operation circuits are constructed, including defuzzifiers, by using CCD devices having well suited properties and characteristics, and a full-fledged fuzzy computer is constructed using a number of such fuzzy logic operation circuit devices.

Unlike a fuzzy control apparatus in which a conventional digital computer is used in the input and output sections, the fuzzy computer of the present invention is constructed in "massive parallelism". Therefore, fast and efficient information processing can be performed.

The use of a CCD light-receiving device group as a fuzzy input signal source, as in the basic circuits shown in FIGS. 1 and 2, enables an illuminance distribution state on a light-receiving device group to which light is radiated to be processed directly. Therefore, the present invention is effective in the fields of photometry and image processing.

As many apparently widely different embodiments of this invention may be made without departing from the spirit and scope thereof, it is understood that the invention is not limited to the specific embodiments thereof except as defined in the appended claims.

I claim:

1. A fuzzy logic operation circuit for two analog inputs, comprising:

two identical charge coupled devices, each charge coupled device including (a) at least one charge transfer electrode for transferring an input charge signal, (b) at least first and second output gate electrodes and (c) a floating gate at one charge transfer electrode for detecting the input charge signal being transferred; and comparison means operatively connected to said charge coupled devices for comparing charge signals being detected from each floating gate and producing a selection signal whereby an input signal of either the smaller or greater of the two inputs is selected and output.

2. A fuzzy logic operation circuit for a maximum analog input selection, comprising:

a plurality of identical charge coupled devices, each charge coupled device including (a) at least one charge transfer electrode for transferring an input charge signal, (b) at least first and second output gate electrodes and (c) a floating gate at one charge transfer electrode for detecting the input charge signal being transferred; and means for selecting a maximum input signal operatively connected to said floating gates and charge coupled devices, said selecting means producing a maximum input selection signal whereby a maximum input is selected and output from said plurality of inputs.

* * * * *